3,654,153
CUTTING FLUID FOR COLD WORK
Jury Ivanovich Nikitin, Krasnopolskaya ulitsa 11/13, kv. 41; Sergei Mikhailovich Sokhin, Krasnopolskaya ulitsa 11/13, kv. 29; and Boris Vakulovich Pogorely, Radomyshlskaya ulitsa 25, kv. 77, all of Kiev, U.S.S.R.
No Drawing. Filed Oct. 20, 1969, Ser. No. 867,945
Int. Cl. C10m 1/20, 1/28
U.S. Cl. 252—42.1        2 Claims

ABSTRACT OF THE DISCLOSURE

A water-base cutting fluid for cold work, particularly for metal grinding, which contains sodium carbonate and an addition of sodium carboxymethyl cellulose $[C_6H_7O_2(OCH_2COONa)_3]_n$.

---

This invention relates to cutting fluids which find application in the machine-building industry for abrasive (diamond) metal working and, more particularly, for metal grinding and cutting.

Currently available for use in conjunction with abrasive (diamond) finishing are diverse cutting fluids, such as kerosene, a kerosene-liquid oil mixture, a 3% aqueous solution of soda, and a 1% aqueous solution of triethanolamine containing 0.25% of borax.

Kerosene is noted for its fairly good detergency and wetting power, which properties provide adequate conditions for abrasive grains to produce the desired effect. However, the use of kerosene as a cutting fluid is restricted, insofar as it involves health and other hazards.

Triethanolamine-containing cutting fluids may damage the electrical insulation, on penetration into the electric drive of machine tools used.

The employment of 3% soda solution does not prevent diamond wheels from being soiled, so that cutting properties of the tools undergo deterioration.

It is an object of the present invention to eliminate the aforementioned disadvantages.

It is a further and more specific object of the present invention to provide a cutting fluid which will be simple in composition and safe in handling, will prevent abrasive tools from soiling in the course of operation, make for removing the heat generated, as well as for washing off the chips, grinding dust and the products of cutting fluid decomposition, and, hence, will ensure the continual preservation of cutting properties of the tools used.

These objects have been accomplished by the provision of water-base sodium carbonate-containing cutting fluid for cold work and, more particularly, for grinding operations, which contains, according to the invention, sodium carboxymethyl cellulose $[C_6H_7O_2(OCH_2COONa)_3]$ taken in an amount of up to 1%.

It is preferable that the components of the cutting fluid be taken in the following proportions: sodium carboxymethyl cellulose, 0.05–0.5%; sodium carbonate, 0.1–0.5%, and water, 99.00–99.94%.

Sodium carboxymethyl cellulose displays a number of characteristics which meet the requirements imposed on cutting fluids. The aqueous dispersions of the aforesaid salts are noted for their good film-forming properties, an added advantage being that the films formed are of adequate mechanical strength. It is also noteworthy that the molecules of sodium carboxymethyl cellulose used consist of polymeric chains which are highly lyophilic and, hence, display pronounced wetting properties. Due to the combination of good film-forming characteristics and high wetting power the present cutting fluid displays enhanced spreadability over and improved wetting of the tool surface, provides for better removal of chips, grinding dust and cutting fluid decomposition products and, hence, makes for a more efficient utilization of lubricating and other properties inherent in the cutting fluid, according to the invention.

Sodium carbonate acts not only as rust inhibitor, but exerts simultaneously a stabilizing effect on the solution of sodium carboxymethyl cellulose.

The present cutting fluid is prepared by mixing appropriate components by conventional procedures.

For a better understanding of the invention, presented hereinbelow by way of illustration are the exemplary compositions of the present cutting fluids and the results of relevant tests.

EXAMPLE 1

The cutting fluid, which contains 0.03% of $Na_2CO_3$, 0.08% of $[C_6H_7O_2(OCH_2COONa)_3]_n$, and 99.89% of water, was used in conjunction with hard-alloy cutter sharpening by cup-shaped, metal-bonded diamond wheels. Experiments showed the diamond wheel to be free from soiling after sharpening 1,800 cutters, whereas when use was made of 3% soda solution as cutting fluid the diamond wheel was soiled after sharpening as little as 300 cutters.

EXAMPLE 2

The cutting fluid, which contains 0.3% of $Na_2CO_3$, 0.2% of $[C_6H_7O_2(OCH_2COONa)_3]_n$, and 99.5% of water was used for polishing a hard alloy by cup-shaped diamond wheels. No soiling of the diamond wheels was observed, and the specific consumption of diamonds equalled 0.21 mg./g. as against 0.46 mg./g. the cutting fluid used consisted of 3% soda solution, and the throughput of the grinding machine increased, on the average, by a factor of 2.5.

EXAMPLE 3

The employment of the cutting fluid of Example 2 for cylindrical grinding of hard-alloy workpieces made it possible to increase the longitudinal feed of workpieces to 0.7 m./min. as against 0.5 m./min. in case the cutting fluid consisted of 3% soda solution. The transverse feed was raised to 0.005 mm. per double pass as against a transverse feed of 0.0025 mm. per double pass obtainable with the 3% soda solution.

The specific consumption of diamonds equalled 0.44 mg./g. as against 1.77 mg./g. observed where use was made of 3% soda solution.

No diamond wheel soiling was detected.

Hence, the present cutting fluid makes it possible to intensify the operation conditions of machine tools, raise the throughput by a factor of 2.5, attain, on the average, a 1.5-fold reduction of the specific consumption of diamonds, and also decrease the consumption of power.

We claim:
1. Cutting fluid for abrasive metal cold working, particularly for metal grinding, consisting essentially of

| | Wt. percent |
|---|---|
| Sodium carboxymethyl-cellulose | 0.05–0.5 |
| Sodium carbonate | 0.01–0.5 |
| Water | 99.0–99.94 |

2. A method of abrasive metal cold working comprising treating the metals being cold worked with the cutting fluid of claim 1.

References Cited

UNITED STATES PATENTS

| 2,583,492 | 1/1952 | Pollok | 252—161 |
| 2,697,072 | 12/1954 | Roden | 252—18 |
| 2,717,239 | 9/1955 | Fischer et al. | 252—8.5 M |
| 3,526,595 | 9/1970 | Pellaton | 252—49.3 X |

OTHER REFERENCES

Mantell: "Water Soluble Gums," pub. by Reinhold Pub. Co. (1947), pp. 145 to 154.

Colvin et al.: "Grinding Practice," 3rd edn. (1950), pub. by McGraw-Hill, p. 84.

DANIEL E. WYMAN, Primary Examiner

W. H. CANNON, Assistant Examiner

U.S. Cl. X.R.

252—41, 49.3